(12) United States Patent
Ravi et al.

(10) Patent No.: US 10,396,979 B2
(45) Date of Patent: Aug. 27, 2019

(54) METHODS AND SYSTEMS FOR CREATING A UNIQUE IDENTIFICATION NUMBER TO MAINTAIN CUSTOMER PRIVACY

(71) Applicant: HONDA MOTOR CO., LTD., Tokyo (JP)

(72) Inventors: Narendran Ravi, Torrance, CA (US); Aparajithan Rajendran, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 152 days.

(21) Appl. No.: 15/693,973

(22) Filed: Sep. 1, 2017

(65) Prior Publication Data

US 2019/0074960 A1  Mar. 7, 2019

(51) Int. Cl.
*H04L 29/00* (2006.01)
*H04L 9/06* (2006.01)
(Continued)

(52) U.S. Cl.
CPC ........ *H04L 9/0643* (2013.01); *G06F 21/6245* (2013.01); *H04L 9/3239* (2013.01);
(Continued)

(58) Field of Classification Search
CPC ............... H04L 9/0643; H04L 2209/80; H04L 2209/84; H04L 9/3239; H04L 9/3297; H04L 2209/42; G06F 21/6245
See application file for complete search history.

(56) References Cited

U.S. PATENT DOCUMENTS

| | | | |
|---|---|---|---|
| 8,639,922 B2* | 1/2014 | Phatak | G06F 21/34 713/156 |
| 8,964,984 B2* | 2/2015 | Abl | H04L 63/0428 380/255 |

(Continued)

FOREIGN PATENT DOCUMENTS

DE    10 2014 005 589 A1    9/2014

OTHER PUBLICATIONS

Zhang et al., "VProof: Lightweight Privacy-Preserving Vehicle Location Proofs," in IEEE Transactions on Vehicular Technology, vol. 64, No. 1, pp. 378-385, Jan. 2015. (Year: 2015).*

(Continued)

*Primary Examiner* — Don G Zhao
(74) *Attorney, Agent, or Firm* — Arent Fox LLP (57) ABSTRACT

Systems and methods for creating a unique identification number to maintain customer privacy. The system includes a memory that stores instructions for executing processes for creating the unique identification number and a processor configured to execute the instructions. The processes include: generating a first identification number based on vehicle information and a timestamp; performing a first hashing function on the first identification number to create a second identification number; performing a second hashing function on the second identification number and a customer identification number to create a third identification number; transmitting an allocation resource request to a third party provider, the allocation resource request including the third identification number and a location of a vehicle; and transmitting the charging schedule to the vehicle upon receipt of a response to the allocation resource request from the third party provider, the response to the allocation resource request including the third identification number.

20 Claims, 5 Drawing Sheets

(51) Int. Cl.
*G06F 21/62* (2013.01)
*H04L 9/32* (2006.01)

(52) U.S. Cl.
CPC ........ *H04L 9/3297* (2013.01); *H04L 2209/42* (2013.01); *H04L 2209/80* (2013.01); *H04L 2209/84* (2013.01)

(56) References Cited

U.S. PATENT DOCUMENTS

| | | | | |
|---|---|---|---|---|
| 9,338,013 | B2* | 5/2016 | Castellucci | G06F 16/1734 |
| 9,615,248 | B2* | 4/2017 | Berge | H04W 12/02 |
| 10,037,633 | B2* | 7/2018 | Gintz | G06F 8/65 |
| 10,070,311 | B2* | 9/2018 | Lee | H04W 12/06 |
| 10,158,492 | B2* | 12/2018 | Pearce | H04L 9/3247 |
| 2013/0212659 | A1 | 8/2013 | Maher et al. | |
| 2014/0108789 | A1* | 4/2014 | Phatak | G06F 21/34 |
| | | | | 713/156 |
| 2014/0281491 | A1 | 9/2014 | Zaverucha et al. | |
| 2015/0188715 | A1* | 7/2015 | Castellucci | G06F 16/1734 |
| | | | | 713/178 |
| 2016/0323741 | A1* | 11/2016 | Lee | H04W 12/06 |
| 2017/0060559 | A1* | 3/2017 | Ye | G06F 8/65 |
| 2017/0346637 | A1* | 11/2017 | Zhang | H04L 9/0643 |
| 2018/0018723 | A1* | 1/2018 | Nagla | G06Q 30/0609 |
| 2018/0315309 | A1* | 11/2018 | Becker | G08G 1/133 |

OTHER PUBLICATIONS

Hubaux, et. al., "The Security and Privacy of Smart Vehicles," IEEE Security & Privacy, 2(3), pp. 49-55, 2004.
Lin, X., "Secure and Privacy-Preserving Vehicular Communications," University of Waterloo Thesis, Chapter 3, 2008.

* cited by examiner

METHODS AND SYSTEMS FOR CREATING A UNIQUE IDENTIFICATION NUMBER TO MAINTAIN CUSTOMER PRIVACY

TECHNICAL FIELD

The present disclosure relates to methods and systems for creating a unique identification number to maintain customer privacy.

BACKGROUND

An electric vehicle may use one or more electric motors for propulsion of the vehicle. The electric motors may be powered by rechargeable batteries on-board the vehicle. A driver of an electric vehicle may typically recharge the batteries of the vehicle according to different charging modes that transfer electric energy to the vehicle. A utility company may supply the electric energy to the charging station and charge the vehicle with the electric energy based on the time, day, month, and/or calendar season. Typically, a utility company may provide charge based on off-peak hours versus peak hours, with peak hours being more expensive than off-peak hours. If an electric vehicle is being charged by a single user, manufacturing servers and utility providers may set certain charging parameters based on the charging patterns of the user. However, in some instances, a vehicle may be shared by multiple users, such as family members and/or roommates. Requests for resources provided to the third party provider, however, may include information identifying a customer or the customer's vehicle.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the present disclosure relates to a system that includes a memory that stores instructions for executing processes for creating a unique identification number to maintain customer privacy, and a processor configured to execute the instructions. In some aspects, the instructions may cause the processor to generate a first identification number based on vehicle information and a timestamp and to perform a first hashing function on the first identification number to create a second identification number. The instructions may also cause the processor to perform a second hashing function on the second identification number and a customer identification number to create a third identification number and to transmit an allocation resource request to a third party provider, the allocation resource request including the third identification number and a location of a vehicle. The instructions may further cause the processor to transmit the charging schedule to the vehicle upon receipt of a response to the allocation resource request from the third party provider, the response to the allocation resource request including the third identification number.

In a further aspect, the present disclosure relates to a method that includes generating a first identification number based on vehicle information and a timestamp and performing a first hashing function on the first identification number to create a second identification number. The method also includes performing a second hashing function on the second identification number and a customer identification number to create a third identification number and transmitting an allocation resource request to a third party provider, the allocation resource request including the third identification number and a location of a vehicle. The method further includes transmitting the charging schedule to the vehicle upon receipt of a response to the allocation resource request from the third party provider, the response to the allocation resource request including the third identification number.

In a still further aspect, the present disclosure relates to a non-transitory computer-readable storage medium containing executable computer program code. The code includes instructions configured to cause a processor to generate a first identification number based on vehicle information and a timestamp and to perform a first hashing function on the first identification number to create a second identification number. The code also includes instructions configured to cause the processor to perform a second hashing function on the second identification number and a customer identification number to create a third identification number and to transmit an allocation resource request to a third party provider, the allocation resource request including the third identification number and a location of a vehicle. The code further includes instructions configured to cause the processor to transmit the charging schedule to the vehicle upon receipt of a response to the allocation resource request from the third party provider, the response to the allocation resource request including the third identification number.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Figure 1:
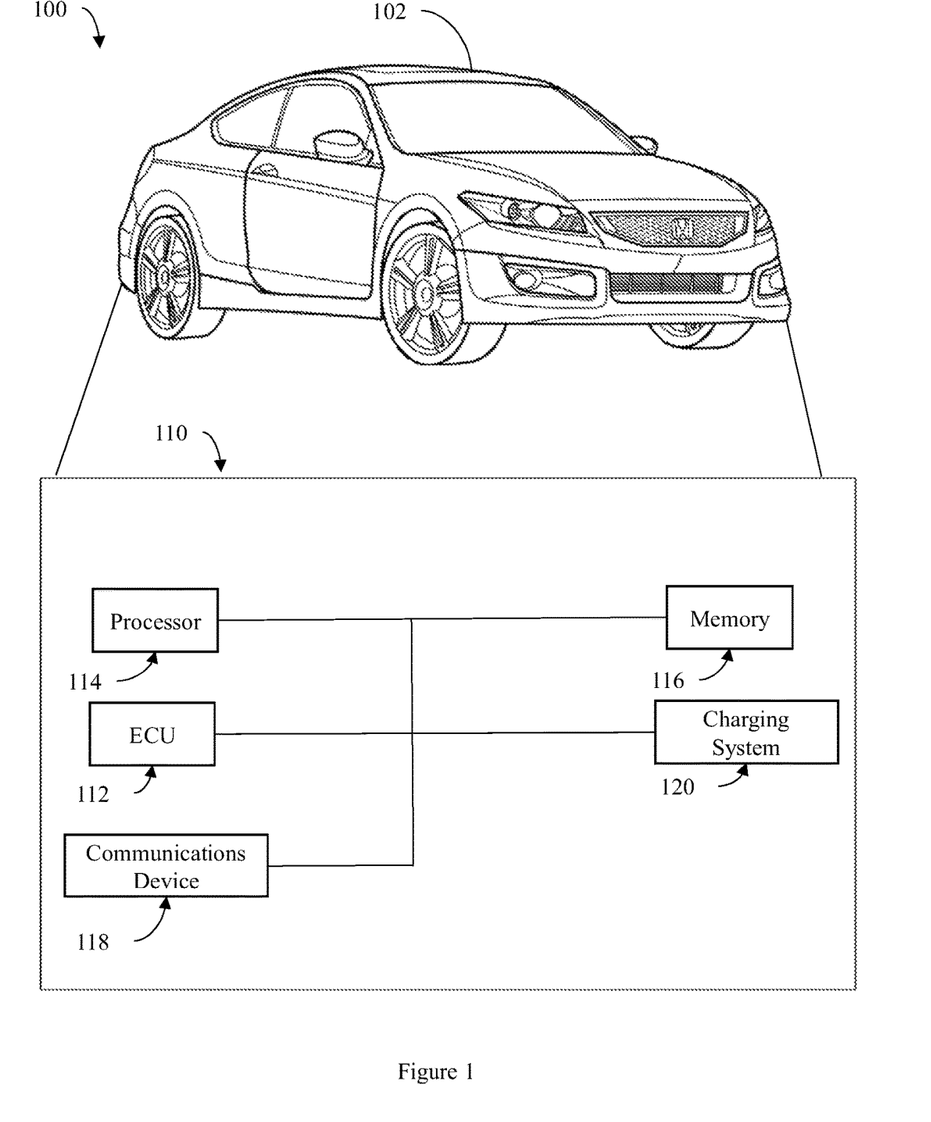
FIG. 1 illustrates a schematic view of an exemplary operating environment of a vehicle system in accordance with aspects of the present disclosure.

Generally described, the present disclosure provides systems and methods for creating a unique identification number to maintain customer privacy. Turning to FIG. 1, a schematic view of an exemplary operating environment 100 of a vehicle system 110 according to an aspect of the disclosure is provided. The vehicle system 110 may reside within a vehicle 102. The components of the vehicle system 110, as well as the components of other systems, hardware architectures, and software architectures discussed herein, may be combined, omitted or organized into various implementations.

In some aspects, the vehicle 102 may be an electric vehicle that contains an electric motor (not shown) for propelling the vehicle 102. In further aspects, the vehicle 102 may be for example, a plug-in hybrid electric vehicle, that includes an electric motor and an internal combustion engine (not shown) for propelling the vehicle 102.

The vehicle 102 may include an electronic control unit (ECU) 112 that operably controls a plurality of vehicle systems. The ECU 112 may include internal processing memory, an interface circuit, and bus lines for transferring data, sending commands, and communicating with the vehicle systems. The ECU 112 may include an internal processor and memory (not shown). The vehicle 102 may also include a bus for sending data internally among the various components of the vehicle system 110. The vehicle systems may include, but are not limited to, the vehicle system 110, among others, including vehicle HVAC systems, vehicle audio systems, vehicle video systems, vehicle infotainment systems, vehicle telephone systems, and the like. The vehicle system 110 may also include a processor 114 and a memory 116 that communicate with the ECU 112.

The vehicle 102 may further include a communications device 118 (e.g., wireless modem) for providing wired or wireless computer communications utilizing various protocols to send/receive electronic signals with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 118 of the vehicle 102 may be operably connected for internal computer communication via a bus (e.g., a CAN or a LIN protocol bus) to facilitate data input and output between the electronic control unit 112 and vehicle features and systems. In some aspects, the communications device 118 may be configured for vehicle-to-vehicle (V2V) communications, vehicle-to-pedestrian (V2P) communications, and/or vehicle-to-anything (V2X) communications. For example, V2V, V2P, and V2X communications may include wireless communications over a reserved frequency spectrum. As another example, V2V, V2P, and V2X communications may include an ad hoc network between vehicles set up using Wi-Fi or Bluetooth®. In further aspects, the communications device 118 may be configured for remote communications with a manufacturer system. In some aspects, the communication device 118 may transmit a vehicle identification number (VIN) to the manufacturer system. In some aspects, the communication device 118 may also transmit a location of the vehicle 102 to the manufacturer system.

The vehicle 102 may further include a charging system 120. For example, the charging system 120 may include the electric motor of the vehicle 102, which may be powered by rechargeable batteries (not shown) on-board the vehicle 102. The on-board batteries may be charged when the vehicle 102 is connected to a charging station. In some aspects, the charging system 120 may be connected to a charging station via a charging cable. In further aspects, the charging system 120 may be connected to the charging station wirelessly. The charging station may be a device that provides electric energy to the vehicle 102. The electric energy may be supplied to the charging station by a third party, such as a utility company, through an electrical grid. In some aspects, the charging station may be located at a driver's home or office. In further aspects, the charging station may be located at a public location, such as a retail shopping center or a rest stop.

The charging system 120 may include a display and a control unit. In some aspects, the display illustrates information exchanged between entities connected to a communication network, see, e.g., FIG. 2. The display may also receive instructions from the user regarding a charging mode for charging the vehicle 102 when the vehicle 102 is connected to the charging station. In some aspects, the vehicle 102 may be charged based on a charging mode selected by a user. For example, the charging mode may be one of a regular charging mode, an economic charging mode, a green charging mode, a fast charging mode, or a slow charging mode. These charging modes are only examples of charging modes available to the user, and it should be understood that other charging modes are also contemplated according to aspects of the present disclosure.

In some aspects, in the regular charging mode, the control unit initiates charging the vehicle 102 regardless of the current cost of electric energy. In further aspects, in the economic mode, the control unit initiates charging the vehicle 102 regardless of the current cost of electric energy, and continues charging the vehicle 102 until the state of charge of the battery of the vehicle 102 reaches a minimum state of charge. Once the battery reaches the minimum state of charge, the control unit postpones charging the remainder of the battery until the cost of charging the battery is reduced, such as during off-peak times. In further aspects, in the economic mode, the control unit may initiate charging the vehicle when the costs of the electric energy are reduced, e.g., during off-peak hours.

Additionally, in the green charging mode, the control unit initiates charging the battery when the electric energy provided to the charging station is generated using a renewable energy sources, e.g., sun, wind, or tides. Furthermore, in the fast charging mode, the control unit initiates a charging to provide a predetermined range, e.g., a number of miles/kilometers, in shortened period of time, e.g., 10-30 minutes. This mode of charging may be used, for example, at rest stops, by commuters in metropolitan areas, or while parked at a retail shopping center. The fast charging mode may also offer a restricted charge, e.g., stopping at a predetermined charge level, or may change the charging rate to a lower level after reaching the predetermined charge level. In the slow charging mode, the charging station may provide between 2 and 5 miles per hour. The slow charging mode may be used when a user travels a shorter distance each day, e.g., less than 40 miles a day, and may be able to charge the vehicle overnight.

Figure 2:
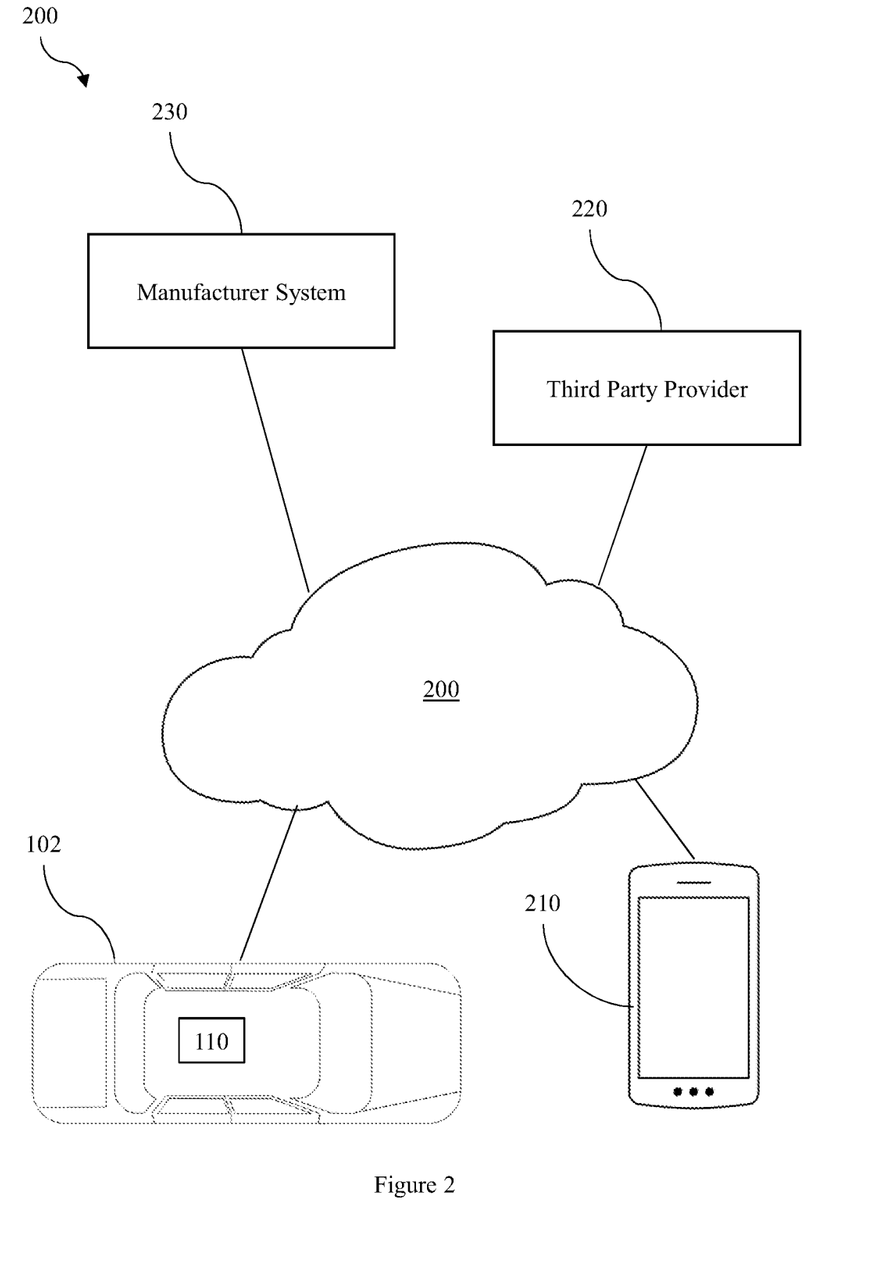
FIG. 2 illustrates an exemplary network for managing the vehicle system, in accordance with aspects of the present disclosure.

FIG. 2 illustrates an exemplary network 200 for managing the vehicle system 110.

The network 200 may be a communications network that facilitates communications between multiple systems. For example, the network 200 may include the Internet or another Internet Protocol (IP) based network. The network 200 may enable the vehicle system 110 to communicate with a mobile device 210, a third party provider 220, or a manufacturer system 230. The vehicle system 110 within the vehicle 102 may communicate with the network 200 via the communications device 118. The vehicle system 110 may, for example, transmit/receive charging information to/from the manufacturer system 230.

Figure 3:
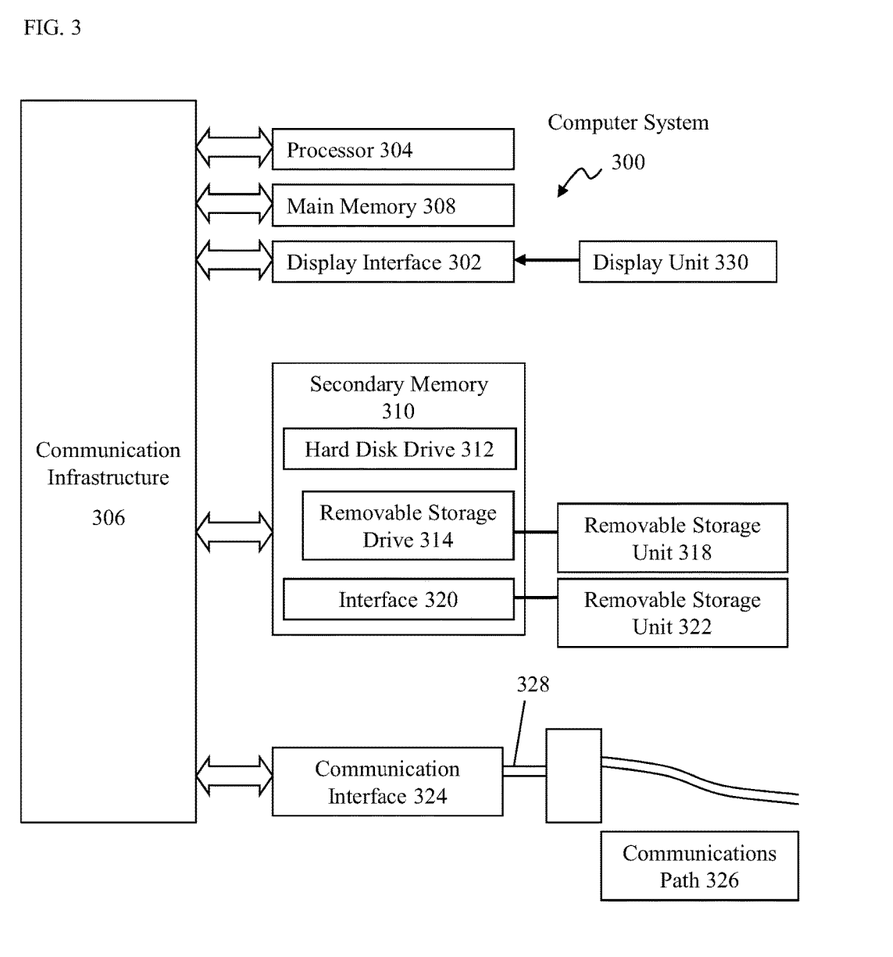
FIG. 3 illustrates various features of an exemplary computer system for use in conjunction with aspects of the present disclosure.

The manufacturer system 230 may include a computer system, as shown with respect to FIG. 3 described below, associated with one or more vehicle manufacturers or dealers. The manufacturer system 230 may include one or more databases that store data related to charging patterns of the vehicle 102. The manufacturer system 230 may also include a memory that stores instructions for executing processes for creating a unique identification number for a customer to be used when communicating with a third party vendor and a processor configured to execute the instructions. In some aspects, the manufacturer system 230 may receive the VIN from the vehicle 102 and combine the VIN with a timestamp to create a first identification number. In some aspects, the VIN and timestamp may be combined by concatenating the VIN and the timestamp. The timestamp may include the date and/or time at which the VIN was received from the vehicle 102. The manufacturer system 230 may then hash the first identification using a cryptographic hashing function to generate a second identification number. For example, the cryptographic hashing function may be any SHA-2 algorithm (Secure Hash Algorithm 2) or SHA-3 algorithm (Secure Hash Algorithm 3), although other cryptographic hashing functions are also contemplated according to aspects of the present disclosure.

In further aspects, the manufacturer system 230 may retrieve a customer identification number (customer ID) stored on the manufacturer system 230. In some aspects, the customer ID may be associated with the VIN received from the vehicle 102 and identifies an operator of the vehicle 102. In this way, the manufacturer system 230 may retrieve the customer ID upon receipt of the VIN from the vehicle. In further aspects, the manufacturer system 230 may also hash the second identification number with the customer ID using a cryptographic hashing function to generate a third identification number. For example, the cryptographic hashing function may be any SHA-2 algorithm (Secure Hash Algorithm 2) or SHA-3 algorithm (Secure Hash Algorithm 3), although other cryptographic hashing functions are also contemplated according to aspects of the present disclosure.

In further aspects, after the third identification number is generated, the manufacturer system 230 may transmit a request for a resource allocation for the vehicle 102. The request may include, for example, the third identification number and a location of the vehicle. By using the third identification rather than the VIN or the customer ID, such the identity of the vehicle and the customer are both concealed from the third party provider. In response to the request for the resource allocation, the third party provider 220 may transmit a charging schedule for the vehicle 102 along with the third identification to the manufacturer system 230. In some aspects, the charging schedule may be based on the preferred charging mode of the user and/or other charging preferences of the user. Upon receipt of the charging schedule from the third party provider 220, the manufacturer system 230 may decode the third identification number to identify the relevant customer and/or vehicle, and send the charging schedule back to the appropriate vehicle.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system 300 is shown in FIG. 3.

Computer system 300 includes one or more processors, such as processor 304. The processor 304 is connected to a communication infrastructure 306 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 300 may include a display interface 302 that forwards graphics, text, and other data from the communication infrastructure 306 (or from a frame buffer not shown) for display on a display unit 330. Computer system 300 also includes a main memory 308, preferably random access memory (RAM), and may also include a secondary memory 310. The secondary memory 310 may include, for example, a hard disk drive 312, and/or a removable storage drive 314, representing a floppy disk drive, a magnetic tape drive, an optical disk drive, a universal serial bus (USB) flash drive, etc. The removable storage drive 314 reads from and/or writes to a removable storage unit 318 in a well-known manner. Removable storage unit 318 represents a floppy disk, magnetic tape, optical disk, USB flash drive etc., which is read by and written to removable storage drive 314. As will be appreciated, the removable storage unit 318 includes a computer usable storage medium having stored therein computer software and/or data.

Alternative aspects of the present disclosure may include secondary memory 310 and may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328, which may be electronic, electromagnetic, optical or other signals capable of being received by communications interface 324. These signals 328 are provided to communications interface 324 via a communications path (e.g., channel) 326. This path 326 carries signals 328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 318, a hard disk installed in hard disk drive 312, and signals 328. These computer program products provide software to the computer system 300. Aspects of the present disclosure are directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features in accordance with aspects of the present disclosure, as discussed herein. In particular, the computer programs, when executed, enable the processor 304 to perform the features in accordance with aspects of the present disclosure. Accordingly, such computer programs represent controllers of the computer system 300.

In an aspect of the present disclosure where the disclosure is implemented using software, the software may be stored in a computer program product and loaded into computer system 300 using removable storage drive 314, hard drive 312, or communications interface 320. The control logic (software), when executed by the processor 304, causes the processor 304 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 4:
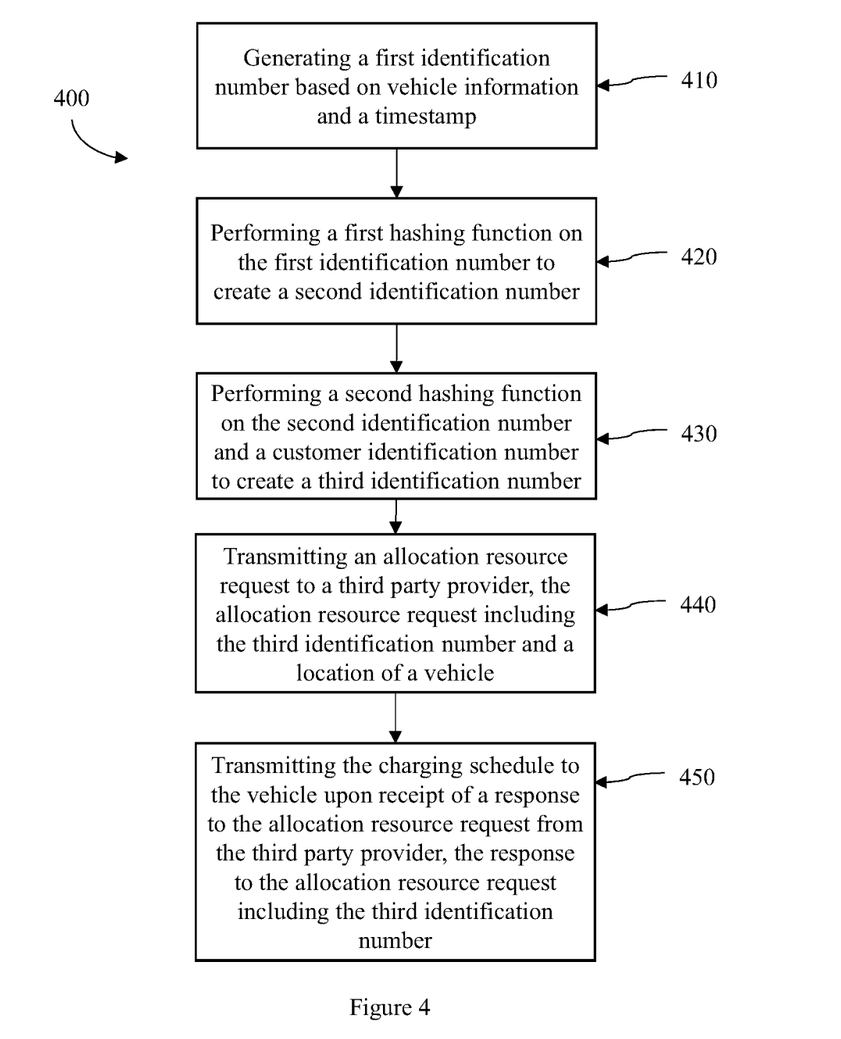
FIG. 4 illustrates an exemplary flowchart for creating a unique identification number to maintain customer privacy, in accordance with aspects of the present disclosure.

FIG. 4 illustrates an exemplary flowchart for creating a unique identification number to maintain customer privacy. A method 400 includes generating a first identification number based on vehicle information and a timestamp 410. The method also includes performing a first hashing function on the first identification number to create a second identification number 420. The method further includes performing a second hashing function on the second identification number and a customer identification number to create a third identification number 430. In addition, the method includes transmitting an allocation resource request to a third party provider, the allocation resource request including the third identification number and a location of a vehicle 440. The method also includes transmitting the charging schedule to the vehicle upon receipt of a response to the allocation resource request from the third party provider, the response to the allocation resource request including the third identification number 450.

Figure 5:
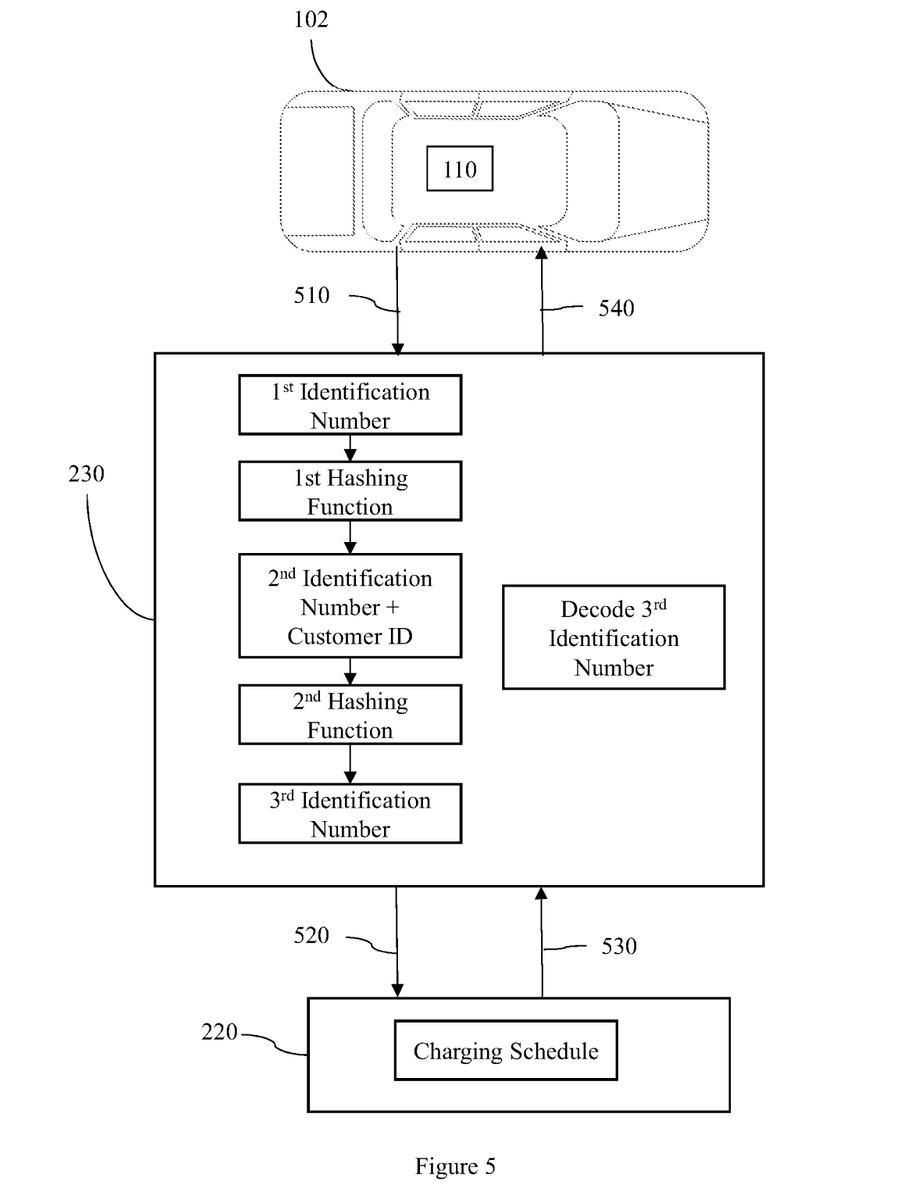
FIG. 5 illustrates another exemplary network for managing the vehicle system, in accordance with aspects of the present disclosure.

FIG. 5 illustrates another exemplary network for managing the vehicle system, in accordance with aspects of the present disclosure. In some aspects, the vehicle 102 may transmit a first signal 510 to the manufacturer system 230. The first signal may include the VIN and may optionally include location information of the vehicle 102. Upon receipt of the VIN, the manufacturer system 230 may combine the VIN with a timestamp to create the first identification number. The manufacturer system 230 may then perform a first hashing function by hashing the first identification using a cryptographic hashing function to generate a second identification number.

In further aspects, the manufacturer system 230 may retrieve a customer ID stored on the manufacturer system 230 and perform a second hashing function on the second identification number and the customer ID to generate a third identification number. In further aspects, after generated the third identification number, the manufacturer system 230 may transmit a second signal 520 to the third party provider 220 containing a request for a resource allocation for the vehicle 102. The request may include, for example, the third identification number and a location of the vehicle 102. By using the third identification rather than the VIN or the customer ID, such the identity of the vehicle and the customer are both concealed from the third party provider.

In response to the request for the resource allocation, the third party provider 220 may transmit a third signal 530 back to the manufacturing system 230 having a charging schedule for the vehicle 102 along with the third identification. Upon receipt of the third signal 530, the manufacturer system 230 may decode the third identification number to identify the relevant customer and/or vehicle, and send a fourth signal 540 having the charging schedule to the appropriate vehicle.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system comprising:
   a memory that stores instructions for executing processes for creating a unique identification number to maintain customer privacy; and
   a processor configured to execute the instructions, wherein the instructions cause the processor to:
      generate a first identification number based on vehicle information and a timestamp;
      perform a first hashing function on the first identification number to create a second identification number;

perform a second hashing function on the second identification number and a customer identification number to create a third identification number;

transmit an allocation resource request to a third party provider, the allocation resource, request including the third identification number and a location of a vehicle; and transmit a charging schedule to the vehicle upon receipt of a response to the allocation resource request from the third party provider, the response to the allocation resource request including the third identification number.

2. The system of claim 1, wherein the instructions cause the processor to decode the response to the allocation resource request to identify the vehicle.

3. The system of claim 1, wherein the vehicle information comprises a vehicle identification number (VIN), and the generating the first identification number comprises concatenating the VIN and the timestamp.

4. The system of claim 3, wherein the timestamp comprises at least one of a date or a time of receipt of the VIN from the vehicle.

5. The system of claim 1, wherein the vehicle information comprises a vehicle identification number (VIN), and the customer identification number is associated with the VIN and identifies an operator of the vehicle.

6. The system of claim 1, wherein the first and second hashing functions are a cryptographic hashing function.

7. The system of claim 6, wherein the cryptographic hashing function is an SHA-2 algorithm (Secure Hash Algorithm 2) or SHA-3 algorithm (Secure Hash Algorithm 3).

8. A method comprising:
generating a first identification number based on vehicle information and a timestamp;
performing a first hashing function on the first identification number to create a second identification number;
performing a second hashing function on the second identification number and a customer identification number to create a third identification number;
transmitting an allocation resource request to a third party provider, the allocation resource request including the third identification number and a location of a vehicle; and
transmitting a charging schedule to the vehicle upon receipt of a response to the allocation resource request from the third party provider, the response to the allocation resource request including the third identification number.

9. The method of claim 8, further comprising decoding the response to the allocation resource request to identify the vehicle.

10. The method of claim 8, wherein the vehicle information comprises a vehicle identification number (VIN), and the generating the first identification number comprises concatenating the VIN and the timestamp.

11. The method of claim 10, wherein the timestamp comprises at least one of a date or a time of receipt of the VIN from the vehicle.

12. The method of claim 8, wherein the vehicle information comprises a vehicle identification number (VIN), and the customer identification number is associated with the VIN and identifies an operator of the vehicle.

13. The method of claim 8, wherein the first and second hashing functions are a cryptographic hashing function.

14. The method of claim 13, wherein the cryptographic hashing function is an SHA-2 algorithm (Secure Hash Algorithm 2) or SHA-3 algorithm (Secure Hash Algorithm 3).

15. A non-transitory computer-readable storage medium containing executable computer program code, the code comprising instructions configured to cause a processor to:
generate a first identification number based on vehicle information and a timestamp;
perform a first hashing function on the first identification number to create a second identification number;
perform a second hashing function on the second identification number and a customer identification number to create a third identification number;
transmit an allocation resource request to a third party provider, the allocation resource request including the third identification number and a location of a vehicle; and
transmit a charging schedule to the vehicle upon receipt of a response to the allocation resource request from the third party provider, the response to the allocation resource request including the third identification number.

16. The non-transitory computer-readable storage medium of claim 15, wherein the instructions cause the processor to decode the response to the allocation resource request to identify the vehicle.

17. The non-transitory computer-readable storage medium of claim 15, wherein the vehicle information comprises a vehicle identification number (VIN), and the generating the first identification number comprises concatenating the VIN and the timestamp.

18. The non-transitory computer-readable storage medium of claim 15, wherein the vehicle information comprises a vehicle identification number (VIN), and the customer identification number is associated with the VIN and identifies an operator of the vehicle.

19. The non-transitory computer-readable storage medium of claim 15, wherein the first and second hashing functions are a cryptographic hashing function.

20. The non-transitory computer-readable storage medium of claim 19, wherein the cryptographic hashing function is an SHA-2 algorithm (Secure Hash Algorithm 2) or SHA-3 algorithm (Secure Hash Algorithm 3).

* * * * *